US 7,276,556 B2

(12) United States Patent
Morita et al.

(10) Patent No.: US 7,276,556 B2
(45) Date of Patent: Oct. 2, 2007

(54) AQUEOUS SUSPENSION OF CROSS-LINKED SILICONE PARTICLES AND AQUEOUS EMULSION OF OIL CONTAINING CROSS-LINKED SILICONE PARTICLES

(75) Inventors: Yoshitsugu Morita, Chiba (JP); Kazuo Kobayashi, Chiba (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 88 days.

(21) Appl. No.: 10/482,621

(22) PCT Filed: May 20, 2002

(86) PCT No.: PCT/JP02/04863

§ 371 (c)(1),
(2), (4) Date: Dec. 22, 2003

(87) PCT Pub. No.: WO03/002637

PCT Pub. Date: Jan. 9, 2003

(65) Prior Publication Data

US 2004/0171699 A1    Sep. 2, 2004

(30) Foreign Application Priority Data

Jun. 29, 2001    (JP) ............................. 2001-198497

(51) Int. Cl.
*B01F 3/12* (2006.01)
*C08L 83/05* (2006.01)
*C08L 83/07* (2006.01)

(52) U.S. Cl. ...................... 524/860; 524/317; 524/339; 524/366; 524/862; 516/34

(58) Field of Classification Search ..................... None
See application file for complete search history.

(56) References Cited

U.S. PATENT DOCUMENTS

| 5,665,804 | A * | 9/1997 | Hill et al. ................... 524/268 |
| 6,238,656 | B1 * | 5/2001 | Morita et al. ............ 424/70.12 |
| 6,403,704 | B1 * | 6/2002 | Bara ......................... 524/837 |
| 6,497,894 | B1 * | 12/2002 | Bratcher et al. ............ 424/405 |
| 6,528,121 | B2 * | 3/2003 | Ona et al. ................... 427/387 |
| 2003/0049212 | A1 * | 3/2003 | Robinson et al. ............. 424/59 |
| 2003/0170193 | A1 * | 9/2003 | Pate et al. ............... 424/70.12 |

FOREIGN PATENT DOCUMENTS

| JP | S63-309565 | 12/1988 |
| JP | H05-009409 | 11/1993 |
| JP | 10-139624 | 5/1998 |
| JP | 10-175816 | 6/1998 |
| JP | H11-140191 | 5/1999 |
| JP | 2000-281903 | 10/2000 |
| WO | WO-9732561 A1 * | 9/1997 |

* cited by examiner

*Primary Examiner*—Marc S. Zimmer
(74) *Attorney, Agent, or Firm*—Howard & Howard Attorneys, P.C.

(57) ABSTRACT

An aqueous suspension of cross-linked silicone particles comprising (A) cross-linked silicone particles having an average diameter of 0.1 to 500 μm, (B) polyoxyethylene sorbitan monolaurate, and (C) water. And, in a second embodiment, an aqueous emulsion of cross-linked silicone particles comprising (A) cross-linked silicone particles having an average diameter of 0.1 to 500 μm, (B) polyoxyethylene sorbitan monolaurate, (C) water, and (D) oil.

16 Claims, No Drawings

AQUEOUS SUSPENSION OF CROSS-LINKED SILICONE PARTICLES AND AQUEOUS EMULSION OF OIL CONTAINING CROSS-LINKED SILICONE PARTICLES

The present invention relates to an aqueous suspension of cross-linked silicone particles and to an aqueous emulsion of cross-linked silicone particles. More particularly, the invention relates to an aqueous suspension of cross-linked silicone particles and to an aqueous emulsion of cross-linked silicone particles which are characterized by excellent stability and do not produce an adverse affect on human health and the environment.

BACKGROUND

Japanese Laid-Open Patent Application (hereinafter referred to as Kokai) S63-309565 and Kokai H11-140191 disclose an aqueous suspension of cross-linked silicone particles that contains at least cross-linked silicone particles, a surface-active agent, and water. Furthermore, Kokai 2000-281903 describes an aqueous emulsion of oil that contains cross-linked silicone particles. It is suggested in Kokai H5-9409 to add the aforementioned suspension to an aqueous coating composition in order to impart matting properties to a coating film. In Kokai 10-139624 and 10-175816 it is proposed to add the aforementioned suspension to a cosmetic material for improving application properties of the cosmetic material.

The aforementioned suspensions and emulsions may be prepared with the use of non-ionic surface-active agents, anionic surface-active agents, cationic surface-active agents, amphoteric surface-active agents, or surface-active agents prepared from mixtures of the above. The use of non-ionic surface-active agents is advantageous since they ensure better dispersion of silicone particles and oil in cosmetic materials. However, in order to impart stability to the suspension or emulsion, to improve dispersibility thereof in a specific compound, and to reduce adverse affects on the environment, a surface-active agent should be properly selected. For example an alkyl polyether having 12 to 15 carbon atoms is an environmentally hazardous chemical substance, the presence of which in waste has to be limited in compliance with the requirements of PRTR (Pollutant Release and Transfer Register) to specific designated substances. Furthermore, the use of surface-active agents of animal-fat origin, e.g., of those prepared from such raw material as beef tallow, in particular the use of surfactants that contain oleyl groups and cetyl groups, or similar alkyl groups, in cosmetic products is limited by Notification of the Pharmaceutical and Chemical Safety Department of the Ministry of Health and Welfare issued on Dec. 12, 2000 and entitled "On Assurance and Quality of Pharmaceutical and Products Manufactured from Raw Material of Beef or other Animal Origin".

On the basis of studies aimed at the solution of the above problems the inventors have found that the above described problems can be solved when an aqueous suspension of cross-linked silicone particles or an aqueous emulsion of oil that contains cross-linked silicone particles is used with a surface-active agent in the form of a polyoxyethylene sorbitan monolaurate. More specifically, it is an object of the present invention to provide an aqueous suspension of cross-linked silicone particles or an aqueous emulsion of oil that contains cross-linked silicone particles which is characterized by excellent stability and by a reduced adverse affect on the environment and on human health.

THE INVENTION

The present invention is an aqueous suspension of cross-linked silicone particles comprising (A) cross-linked silicone particles having an average diameter of 0.1 to 500 μm, (B) polyoxyethylene sorbitan monolaurate, and (C) water. And, in a second embodiment, an aqueous emulsion of cross-linked silicone particles comprising (A) cross-linked silicone particles having an average diameter of 0.1 to 500 μm, (B) polyoxyethylene sorbitan monolaurate, (C) water, and (E) oil.

The present invention is an aqueous suspension of cross-linked silicone particles comprising (A) cross-linked silicone particles having an average diameter of 0.1 to 500 μm, (B) polyoxyethylene sorbitan monolaurate, and (C) water. And, in a second embodiment, an aqueous emulsion of cross-linked silicone particles comprising (A) cross-linked silicone particles having an average diameter of 0.1 to 500 μm, (B) polyoxyethylene sorbitan monolaurate, (C) water, and (E) oil.

The invention will be further described in detail with reference to an aqueous suspension of cross-linked silicone particles. Cross-linked silicone particles (A) are main components of the aforementioned suspension. They should have an average diameter of 0.1 to 500 μm, preferably of 0.1 to 100 μm, more preferably of 0.1 to 50 μm, and even more preferably of 0.5 to 50 μm. When the average diameter of the cross-linked silicone particles is below the lower recommended limit, it will be difficult to prepare the suspension. When, on the other hand, the average diameter of the silicone particles exceeds the upper recommended limit, the obtained suspension either loses stability, or becomes less suitable for dispersion in cosmetic or coating materials. Particles of component (A) may have a spherical, flattened, or irregular shape. The spherical shape provides better conditions for dispersion. The particles may be in a state similar to solid rubber, soft rubber, or gel.

Component (A) may further comprise a non-cross-linked oil. Although there are no special restrictions with regard to the type of the aforementioned oil, it is recommended that the oil should have a viscosity at 25° C. 100,000 mm$^2$/s or less, preferably 50,000 mm$^2$/s or less, and even more preferably 10,000 mm$^2$/s or less. Such oil may be, for example, a silicone oil or an organic oil. A silicone oil is preferable as it has better affinity for the cross-linked silicone particles.

The aforementioned silicone oil may have a linear, a partially-branched linear, cyclic, or a branched molecular structure. The linear or cyclic molecular structure is preferable. This silicone oil can be represented by a dimethylpolysiloxane having both molecular terminals capped with trimethylsiloxy groups, a cyclic dimethylsiloxane, a silicone oil having a portion of methyl groups substituted by ethyl, propyl, butyl or similar alkyl groups, phenyl, or 3,3,3-trifluoropropyl groups, or mixtures of the above.

The following are examples of organic oils useful in the present invention: liquid paraffin, iso-paraffin, hexyl laurate, isopropyl myristate, myristyl myristate, cetyl myristate, 2-octyldodecyl myristate, isopropyl palmitate, 2-ethylhexyl palmitate, butyl stearate, decyl oleate, 2-octyldodecyl oleate, myristyl lactate, lanolin acetate, stearyl alcohol, cetostearyl alcohol, oleyl alcohol, avocado oil, almond oil, olive oil, cacao oil, jojoba oil, sesame oil, safflower oil, soybean oil, camellia oil, squalane, parsec oil, castor oil, cotton seed oil, coconut oil, polypropylene monooleate, neopentylglycol-2- ethylhexanoate, triglyceride isostearate, triglyceride of a palm oil fatty acid, polyoxyethylene lauryl ether, and polyoxypropylene cetyl ether.

There are no special limitations with regard to the amount of oil for use in component (A). It is recommended, however, that the oil be used in an amount not exceeding 80 and preferably not exceeding 50 parts by weight per 100 parts by weight of component (A). If the oil is used in an amount exceeding the recommended upper limit, it will be difficult to prepare cross-linked silicone particles. Furthermore, it will be difficult in that case to prepare a below-described aqueous emulsion of oil that contains cross-linked silicone particles.

There are no special restriction with regard to the content of component (A) in a suspension of the invention. It is preferable, however, to use component (A) in an amount of 25 to 80 wt. %. This is because an emulsion with the content of component (A) below the lower recommended value may have a limited scope of practical application. When, however, the content of component (A) exceeds the recommended upper limit, the suspension will become difficult to handle and to disperse in cosmetic and coating materials.

Polyoxyethylene sorbitan monolaurate (B) is an important characteristic component of the suspension. It is used as a non-ionic surface-active agent that imparts to the suspension stability and improves dispersibility thereof in cosmetic and coating materials, and at the same time reduces effect on human health and environment. There are no special limitations with regard to the addition mole number of ethylene oxide in component (B). It is recommended, however to have this number within a range of 10 to 25, preferably between 18 and 22. Similarly there are no restrictions for the HLB (HYDROPHILIC-LIPOPHILIC BALANCE) of component (B), but the recommended value should be at least 10. Component (B) is commercially produced by Kao Co., Ltd. under the following trademarks: REODOL TW-L106, REODOL TW-L120, EMASOL L-120, and REODOL SUPER-TW-L120.

Although there are no special limitations with regard to the amount of component (B) in the suspension of the invention, it is recommended that this component be used in an amount from 0.001 to 20 wt. %, preferably from 0.01 to 10 wt. %. This is because with the content of component (B) below the recommended lower level, the suspension will lose its stability and will have poor dispersity in cosmetic and coating materials. If, however, the content of component (B) exceeds the upper recommended level the suspension will have a limited scope of practical applications.

Component (C) water is a medium in which component (A) is dispersed. This medium can be represented by, for example, pure water or ion-exchange water.

The suspension of the invention comprises component (A), component (B), and component (C). If necessary, phenoxyethanols described by the following general formula can be used as component (D):

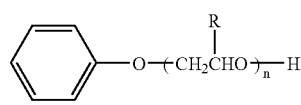

Component (D) improves the surface-active properties of component (B) so that component (A) can be dispersed in water with good stability even with a reduced amount of component (B) in the suspension. Furthermore, component (D) can also be used as an anticorrosive agent. In the above formula, R represents a hydrogen atom or a methyl group, where the hydrogen atom is preferable; n is an integer from 1 to 10, preferably 1 to 5, and even more preferably 1. There are no special limitations with regard to purity of component (D). It is recommended, however, that component (D) have purity 95 wt. % or greater, preferably 98 wt. % or greater, and even more preferably 99 wt. % or greater.

There are no special limitations with regard to the amount of component (D) for use in the suspension of the present invention. It is recommended, however, to use component (D) in an amount of from 0.01 to 10 parts by weight, preferably from 0.01 to 1 part by weight, and even more preferably from 0.1 to 1 part by weight per each 100 parts by weight of the sum of components (A), (B), and (C). If component (D) is used in an amount below the lower limit of the recommended range, the suspension of the invention will have low stability, especially when the amount of component (B) is small. If, on the other hand, the content of component (D) exceeds the upper limit of the recommended range, the suspension will have a limited scope of practical application.

If necessary, the suspension of the present invention may contain other suitable components, such as ethanol, i-propanol, t-butanol, ethylene glycol, propylene glycol, diethylene glycol, or a similar alcohol; a carboxyvinyl polymer, carboxymethylcellulose sodium, or a similar water-soluble polymer; as well as anticorrosive, antimicrobal, aromatic agents, and pigments.

There are no special restriction with regard to methods suitable for the preparation of the suspension of the present invention. For example, the composition can be subjected to cross-linking after adding a cross-linkable silicone composition to an aqueous solution of components (B), (C), if necessary with other suitable additives, or the cross-linkable composition can be added to an aqueous solution of components (B) and (C), if necessary, with suitable additives, and dispersed in that solution without the catalyst, which is then added and cross-linking performed. In the second mentioned method, the cross-linking catalyst can be added in the form of a dispersion in an aqueous solution of polyoxyethylene inonolaurate.

Cross-linkable silicone compositions of the following types are suitable for the preparation of the suspension of the present invention: cross-linkable silicone compositions of hydrosilylation-reaction type, cross-linkable compositions of condensation-reaction type, compositions whose cross-linking is promoted by means of organic peroxide, and compositions cross-linkable under the effect of ultraviolet radiation. Cross-linkable silicone compositions of a hydrosilylation reaction type are most suitable.

For example, a cross-linkable silicone composition of hydrosilylation-reaction type may consist at least of the following components: an organopolysiloxane with at least two alkenyl groups in one molecule, an organopolysiloxane with at least two silicone-bonded hydrogen atoms in one molecule, and a platinum-type catalyst.

A condensation-reaction type cross-linkable silicone composition may consist, e.g., at least of the following components: an organopolysiloxane having in one molecule hydroxyl groups bonded to silicon atoms or at least two hydrolysable groups such as an aminoxy groups, acetoxy groups, oxime groups, alkoxy groups, or hydroxyl groups bonded to silicon atoms; a silane-type cross-linking agent having in one molecule at least three hydrolysable groups, such as aminoxy groups, acetoxy groups, oxime groups, or alkoxy groups bonded to silicon atoms; and a condensation-reaction catalyst such as an organotin compound, an organotitanium compound, or the like. Most preferable is a de-alcoholization condensation-reaction type cross-linkable silicone composition consisting at least of an organopolysiloxane having in one molecule at least two silicon-bonded hydroxyl groups or alkoxy groups, a silane-type cross-linking agent having in one molecule at least three silicon-bonded alkoxy groups, and a condensation-reaction catalyst such as an organotin compound, an organotitanium compound, or the like. The aforementioned compounds can be additionally combined with the following components: 3-glycidoxypropyltrimethoxysilane, 3-glycidoxypropylmethyldimethoxysilane, 2-(3,4-epoxycyclohexyl)ethyl trimethoxysilane, 3-methacryloxypropyltrimethoxysilane, 3-methacryloxypropyltriethoxysilane, N-(2-aminoethyl)-3-aminopropyltrimethoxysilane, or a similar organic functional alkoxysilane.

An oil in aqueous emulsion of the present invention that contains cross-linked silicone particles will now be described in more detail. The emulsion of the invention comprises cross-linked silicone particles (A), polyoxyethylene sorbitan monolaurate (B), water (C), and oil (E). The emulsion can be prepared by dispersing components (A) and (E) in water independently or by dispersing in water droplets of component (E) that contain particles of component (A). In accordance with the invention, the emulsion of the second form is preferable.

Cross-linked silicone particles are one of the main components of the emulsion of the present invention. It is recommended that the particles have an average diameter of 0.1 to 500 µm, preferably of 0.1 to 100 µm, even more preferably of 0.1 to 50 µm, and most preferably of 0.5 to 50 µm. If the average diameter of particles is below the recommended lower limit, it will be difficult to prepare cross-linked silicone particles. If, on the other hand, the average diameter of particles exceeds the recommended upper limit, the emulsion will not have stability and will have low dispersibility in cosmetic and coating materials. Particles of component (A) may have a spherical, flat, or irregular shape. The spherical shape is preferable as it provides better conditions for dispersion of particles in cosmetic and coating materials. Component (A) can be in the state of hard rubber, soft rubber, or gel.

Component (E) oil is a main components of the emulsion of the present invention. Although there are no special limitations with regard to the viscosity of oil (E), it is recommended that the oil viscosity at 25° C. be 100,000 mm$^2$/s or less, preferably 50,000 mm$^2$/s, and even more preferably 10,000 mm$^2$/s or less. The oil can be, for example, silicone oil or organic oil. Silicone oil is preferable as it has better affinity with cross-linked silicone particles. The silicone oil may be the same as mentioned earlier. The same relates to the organic oil.

The emulsion of the present invention has no special limitations with regard to the diameter of component (E) droplets dispersed in water, but the recommended range for an average particle diameter is of 0.1 to 500 µm, preferably of 0.1 to 100 µm, more preferably of 0.1 to 50 µm, and even more preferably of 0.5 to 50 µm. If the average diameter of droplets is below the recommended lower limit, it will be difficult to prepare the emulsion. If, on the other hand, the average diameter of droplets exceeds the recommended upper limit, the emulsion may lose its stability, and it will be difficult to disperse the emulsion in cosmetic and coating materials. It is required that in the case where the droplets of component (E) dispersed in water contain component (A), the diameter of the droplets be greater than the diameter of particles of component (A).

There are no special limitations with regard to the required amount of component (E), but depending on oil-absorption properties of component (A), it is recommended that component (E) be used in an amount of 50 wt. % or greater, preferably 60 wt. % or greater based on 100 wt. % of the total weight of both components (A) and (E) together. If component (E) is used in a smaller amount than the recommended lower limit, it will be impossible to incorporate component (A) into component (E) dispersed in water.

There are no limitations with regard to components (A) and (E) in the emulsion of the invention, but the recommended amount is from 25 to 90 wt. %. If the amount of components (A) and (E) is below the recommended lower limit, the emulsion will have a limited scope of applications. If, on the other hand, the amount of components (A) and (E) exceeds the upper recommended limit, it will be difficult to handle and to disperse the emulsion in cosmetic and coating materials.

Polyoxyethylene sorbitan laurate (B) is a specific component of the emulsion of the invention. Component (B) is used as a non-ionic surface-active agent that imparts to the emulsion such properties as stability and improved dispersibility in cosmetic and coating materials, as well as a reduced impact on human health and environment. Although there are no special limitations with regard to the addition mole number of ethylene oxide in component (B), it is recommended to have this number within a range of 10 to 25, preferably 18 to 22. There are no special limitations with regard to the HLB value of component (B), but it is recommended to have this value of at least 10. Examples of component (B) are products of Kao Co., Ltd. known under the following trademarks: REODOL TW-L106, REODOL TW-L120, EMASOL L-120, and REODOL SUPER-TW-L120.

There are no special limitations with regard to the amount of component (B) in the emulsion of the invention, but the recommended amount is from 0.001 to 20 wt. %, and preferably from 0.01 to 10 wt. %. If the amount of component (B) is below the recommended lower limit the emulsion will have low stability and it would be difficult to disperse the emulsion in cosmetic and coating materials. If, on the other hand, the amount of component (B) exceeds the upper recommended limit, the emulsion will have a limited scope of practical applications.

Component (C) water is a medium in which components (A) and (E) are dispersed. This medium can be represented by, for example, pure water or ion-exchange water.

The emulsion of the present invention comprises component (A), component (E), component (B), component (C) and component (E). If necessary, phenoxyethanols described by the following general formula can be used as component (D):

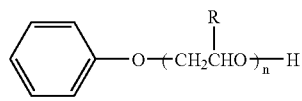

Component (D) improves surface-active properties of component (B) so that component (A) and component (E) can be dispersed in water with good stability, even with a reduced amount of component (B) in the emulsion. Furthermore, component (D) can also be used as an anticorrosive agent. In the above formula, R represents a hydrogen atom or a methyl group, where the hydrogen atom is preferable; and n is an integer from 1 to 10, preferably 1 to 5, and even more preferably 1. There are no special limitations with regard to purity of component (D). It is recommended, however, that component (D) have purity 95 wt. % or greater, preferably 98 wt. % or greater, and even more preferably 99 wt. % or greater.

There are no special limitations with regard to the amount of component (D) for use in the emulsion of the present invention. It is recommended, however, to use component (D) in as amount of 0.01 to 10 parts by weight, preferably 0.01 to 1 part by weight, and even more preferably 0.1 to 1 part by weight for each 100 parts by weight of the sum of components (A), (B), (C), and (E). If component (D) is used in an amount below the lower limits of the recommended range, the emulsion of the invention will have low stability, especially when the amount of component (B) is small. If, on the other hand, the content of component (D) exceeds the upper limit of the recommended range, the emulsion will have a limited scope of practical application.

If necessary, the emulsion of the present invention may contain other suitable components, such as ethanol, i-propanol, t-butanol, ethylene glycol, propylene glycol, diethylene glycol, or a similar alcohol; a carboxyvinyl polymer, carboxymethylcellulose sodium, or a similar water-soluble polymer; as well as anticorrosive, antimicrobal, aromatic agents, and pigments.

There are no special restriction with regard to methods suitable for the preparation of the emulsion of the present invention. For example, the composition can be subjected to cross-linking after adding a cross-linkable silicone composition that contains component (E) to an aqueous solution of components (B) and (C), and if necessary with other suitable additives. Alternatively, a cross-linkable silicone composition that contains component (E) can be added to an aqueous solution of components (B) and (C), if necessary, with suitable additives, and dispersed in that solution without the catalyst, which is then added and cross-linking performed. In the second mentioned method, the cross-linking catalyst can be added in the form of a dispersion in an aqueous solution of polyoxyethylene monolaurate.

Cross-linkable silicone compositions of the following types are suitable for the preparation of the emulsion of the present invention: cross-linkable silicone compositions of hydrosilylation-reaction type, cross-linkable compositions of condensation-reaction type, compositions cross-linking of which is promoted by means of organic peroxide, and compositions cross-linkable under the effect of ultraviolet radiation. Cross-linkable silicone compositions of a hydrosilylation reaction type are most suitable. The aforementioned hydrosilylation-reaction type cross-linkable silicone can be exemplified by the same compositions as given earlier.

The aqueous suspension of the invention that contains cross-linked silicone particles, as well as the aqueous emulsion of the invention that contains oil with cross-linked silicone particles both possess excellent stability and are characterized by a reduced impact on environment and human health, and by improved dispersibility in cosmetic and coating materials.

PRACTICAL EXAMPLES

The aqueous suspension of the invention that contains cross-linked silicone particles, as well as the aqueous emulsion of the invention that contains oil with cross-linked silicone particles will now be described in more detail with reference to practical examples. In these examples, all values of viscosity are as measured at 25° C. Characteristics of the suspensions and emulsion were measured and evaluated by the methods described below.

Average Diameter of Cross-Linked Silicone Particles in the Suspension

Diameters of the particles were measures with a Model LA-500 laser diffraction particle distribution measurement instrument made by Horiba Seisakusho Company. The median diameter obtained (i.e., a particle diameter corresponding to 50% of the accumulated distribution) was defined as the average diameter of a cross-linked silicone particle.

Average Diameter of Oil Drop in the Emulsion

Diameters of the oil drops were measures with a Model LA-500 laser diffraction particle distribution measurement instrument made by Horiba Seisakusho Company. The median diameter obtained (i.e., a drop diameter corresponding to 50% of the accumulated distribution) was defined as the average diameter of an oil drop.

Average Diameter of Cross-Linked Silicone Particles in the Emulsion

An oil composition containing cross-linked silicone particles obtained by removing water from an emulsion was observed under an optical microscope, and then an average value of the diameter was calculated for 10 cross-linked silicone particles.

Suspension and Emulsion Stability

After diluting the suspension or emulsion in water to 50 wt. % concentration of solids, 11.5 g of the sample is poured into a cylindrical glass tube having a 14 mm inner diameter and a 105 mm height. The tube is placed into a centrifugal separator where it is subjected to 2 min centrifugal separation with subsequent measurement of the thickness of the separated water layer. Stability of the suspension or emulsion is evaluated in terms of the thickness of the separated water layer. The thicker the layer, the lower the stability.

Practical Example 1

A uniform mixture was prepared from the following components: 94.8 parts by weight of 400 mm$^2$/s viscosity dimethylvinylsiloxane that contained 2.5 wt. % of about 20 mm$^2$/s viscosity cyclic dimethylsiloxane mixture and had both molecular terminals capped with dimethylvinylsiloxy groups; and 5.2 parts by weight of a 50 mm$^2$/s viscosity copolymer of a methylhydrogensiloxane and a dimethyl siloxane having both molecular terminals capped with trimethylsiloxy groups (with 0.31 wt. % of silicon-bonded hydrogen and with a 0.95 mole ratio of the silicon-bonded hydrogen to vinyl groups in the aforementioned dimethylpolysiloxane). With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20) and 30 parts by weight of pure water. The emulsion was then diluted with 30.9 parts by weight of pure water. As a result, an aqueous emulsion of a three-type silicone composition was prepared.

An aqueous emulsion of a platinum catalyst having a 0.3 µm average particle diameter was prepared by mixing 1 part by weight of a solution of 1,3-divinyltetramethyldisiloxane complexed with platinum, 1,3-divinyltetramethyl disiloxane, and isopropyl alcohol in an aqueous solution prepared from 27 parts by weight of ion-exchange water and 0.3 parts by weight of the aforementioned polyoxyethylene sorbitan monolaurate. After uniformly stirring the aqueous emulsion of a platinum catalyst in an aqueous emulsion of the aforementioned silicone composition (with 5 ppm by weight metallic platinum per weight of the silicone composition), the mixture was allowed to sit for 1 day, and then an aqueous suspension of cross-linked silicone particles was prepared by cross-linking the silicone composition by a hydrosilylation reaction. Average diameter of the cross-linked silicone particles and stability of the obtained suspension are shown in Table 1.

Practical Example 2

A uniform mixture was prepared from the following components: 94.8 parts by weight of 400 mm$^2$/s viscosity dimethylvinylsiloxane containing 2.5 wt. % of about 20 mm$^2$/s viscosity cyclic dimethylsiloxane mixture and having both molecular terminals capped with dimethylvinylsiloxy groups; and 5.2 parts by weight of a 50 mm$^2$/s viscosity copolymer of a methylhydrogen siloxane and dimethyl siloxanes having both molecular terminals capped with trimethylsiloxy groups (with 0.31 wt. % of silicon-bonded hydrogen and a 0.95 mole ratio of the silicon-bonded hydrogen to vinyl groups in the aforementioned dimethylpolysiloxane). With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20) and 20 parts by weight of pure water. The emulsion was then diluted with 30.9 parts by weight of pure water. As a result, an aqueous emulsion of a three-type silicone composition was prepared.

The obtained emulsion was then uniformly stirred with an aqueous solution prepared by mixing the following components: 1 part by weight of a mixed solution of 1,3-divinyltetramethyldisiloxane complexed with platinum, 1,3-divinyltetramethyldisiloxane, and isopropyl alcohol; 27 parts by weight of ion-exchange water; and 0.3 parts by weight of the aforementioned polyoxyethylene sorbitan monolaurate. As a result, an aqueous emulsion of a platinum catalyst having a 0.3 μm average particle diameter was prepared.

After uniformly stirring the aforementioned aqueous emulsion of a platinum catalyst in an aqueous emulsion of the aforementioned silicone composition (with 5 ppm weight units of the metallic platinum per weight of the silicone composition), the mixture was allowed to sit for 1 day, and then an aqueous suspension of cross-linked silicone particles was prepared by cross-linking the silicone composition by a hydrosilylation reaction. Average diameter of the cross-linked silicone particles and stability of the obtained suspension are shown in Table 1.

Practical Example 3

A uniform mixture was prepared from the following components: 94.8 parts by weight of 400 mm$^2$/s viscosity dimethylvinylsiloxane that contained 2.5 wt. % of about 20 mm$^2$/s viscosity cyclic dimethylsiloxane mixture and had both molecular terminals capped with dimethylvinylsiloxy groups; and 5.2 parts by weight of a 50 mm$^2$/s viscosity copolymer of a methylhydrogensiloxane and a dimethylsiloxane having both molecular terminals capped with trimethylsiloxy groups (with 0.31 wt. % of silicon-bonded hydrogen and with a 0.95 mole ratio of the silicon-bonded hydrogen to vinyl groups in the aforementioned dimethylpolysiloxane). With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20) and 15 parts by weight of pure water. The emulsion was then diluted with 30.9 parts by weight of pure water. As a result, an aqueous emulsion of a three-type silicone composition was prepared.

An aqueous emulsion of a platinum catalyst having 0.3 μm average particle diameter was prepared by stirring 1 part by weight of a mixed solution of 1,3-divinyltetramethyldisiloxane complexed with platinum, 1,3-divinyltetramethyl disiloxane, and isopropyl alcohol with an aqueous solution prepared from 27 parts by weight of ion-exchange water and 0.3 parts by weight of the aforementioned polyoxyethylene sorbitan monolaurate.

After uniformly stirring the aforementioned aqueous emulsion of a platinum catalyst in an aqueous emulsion of the aforementioned silicone composition (with 5 ppm weight units of the metallic platinum per weight of the silicone composition), the mixture was allowed to sit for 1 day, and then an aqueous suspension of cross-linked silicone particles was prepared by cross-linking the silicone composition by a hydrosilylation reaction. Average diameter of the cross-linked silicone particles and stability of the obtained suspension are shown in Table 1.

Comparative Example 1

An aqueous suspension of cross-linked silicone particles was prepared by the same method as in Practical Example 1, with the exception that a polyoxyethylene sorbitan monooleate (the product of Kao Co., Ltd.; trademark REODOL SUPER-TW-O120; HLB=15.0; addition mole number of ethylene oxide 20) was used instead of the polyoxyethylene sorbitan monolaurate of Practical Example 1. Average diameter of the cross-linked silicone particles and stability of the obtained suspension are shown in Table 1.

Comparative Example 2

An aqueous suspension of cross-linked silicone particles was prepared by the same method as in Practical Example 2, with the exception that a polyoxyethylene sorbitan monooleate (the product of Kao Co., Ltd.; trademark REODOL SUPER-TW-O120; HLB=15.0; addition mole number of ethylene oxide 20) was used instead of the polyoxyethylene sorbitan monolaurate of Practical Example 2. Average diameter of the cross-linked silicone particles and stability of the obtained suspension are shown in Table 1.

Comparative Example 3

An aqueous suspension of cross-linked silicone particles was prepared by the same method as in Practical Example 3, with the exception that a polyoxyethylene sorbitan monooleate (the product of Kao Co., Ltd.; trademark REODOL SUPER-TW-O120; HLB=15.0; addition mole number of ethylene oxide 20) was used instead of the polyoxyethylene sorbitan monolaurate of Practical Example 3. Average diameter of the cross-linked silicone particles and stability of the obtained suspension are shown in Table 1.

Comparative Example 4

An aqueous suspension of cross-linked silicone particles was prepared by the same method as in Practical Example 1, with the exception that a polyoxyethylene sorbitan monostearate (the product of Kao Co., Ltd.; trademark REODOL SUPER-TW-S120; HLB=14.9; addition mole number of ethylene oxide 20) was used instead of the polyoxyethylene sorbitan monolaurate of Practical Example 1. Average diameter of the cross-linked silicone particles and stability of the obtained suspension are shown in Table 1.

Comparative Example 5

An aqueous suspension of cross-linked silicone particles was prepared by the same method as in Practical Example 3, with the exception that a polyoxyethylene sorbitan monostearate (the product of Kao Co., Ltd.; trademark REODOL SUPER-TW-S120; HLB=14.9; addition mole number of ethylene oxide 20) was used instead of the polyoxyethylene sorbitan monolaurate of Practical Example 3. Average diameter of the cross-linked silicone particles and stability of the obtained suspension are shown in Table 1.

TABLE 1

| Characteristics | Examples | | | | | | | |
| --- | --- | --- | --- | --- | --- | --- | --- | --- |
| | Practical Examples | | | Comparative Examples | | | | |
| | 1 | 2 | 3 | 1 | 2 | 3 | 4 | 5 |
| Average diameter of particles (μm) | 5.7 | 4.7 | 4.2 | 7.0 | 5.2 | 4.7 | 11 | 7.7 |
| Water layer thickness (mm) | 6 | 5 | 3 | 10 | 6 | 7 | 18 | 14 |

Practical Example 4

A uniform mixture was prepared from the following components: 94.8 parts by weight of 400 mm$^2$/s viscosity dimethylvinylsiloxane containing 2.5 wt. % of about 20 mm$^2$/s viscosity cyclic dimethylsiloxane mixture and having both molecular terminals capped with dimethylvinylsiloxy groups; and 5.2 parts by weight of a 50 mm$^2$/s viscosity copolymer of methylhydrogensiloxane and a dimethyl siloxane having both molecular terminals capped with trimethylsiloxy groups (with 0.31 wt. % of silicon-bonded hydrogen and with a 0.95 mole ratio of the silicon-bonded hydrogen to vinyl groups in the aforementioned dimethylpolysiloxane). With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20), 0.8 parts by weight of a phenoxyethanol of the following formula:

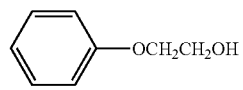

(a product of Yokkaichi Gosei Co., Ltd., type PHE-S; purity 92 to 94 wt. %), and 30.0 parts by weight of pure water. The emulsion was then combined with an aqueous solution prepared from 7.1 parts by weight of ethanol, 0.8 parts by weight of the aforementioned phenoxyethanol, and 18.9 parts by weight of pure water. As a result, an aqueous emulsion of a silicone composition was prepared.

An aqueous emulsion of a platinum catalysts having 0.3 μm average particle diameter was prepared by stirring 1 part by weight of a mixed solution of 1,3-divinyltetramethyl disiloxane complexed with platinum, 1,3-divinyltetramethyl disiloxane, and isopropyl alcohol with an aqueous solution prepared from 27 parts by weight of ion-exchange water and 0.3 parts by weight of the aforementioned polyoxyethylene sorbitan monolaurate.

After uniformly stirring the aforementioned aqueous emulsion of a platinum catalyst in an aqueous emulsion of the aforementioned silicone composition (with 5 ppm weight units of the metallic platinum per weight of the silicone composition), the mixture was allowed to sit for 1 day and then an aqueous suspension of cross-linked silicone particles was prepared by cross-linking the silicone composition by a hydrosilylation reaction. Average diameter of the cross-linked silicone particles was equal to 4 μm. Stability of the obtained suspension was characterized by a 4 mm-thick water layer.

Practical Example 5

A uniform mixture was prepared from 18.02 parts by weight of a 400 mm$^2$/s viscosity copolymer of a dimethylsiloxane and a methylvinylsiloxane having both molecular terminals capped with dimethylvinylsiloxy groups (vinyl group content was 1.18 wt. %), 1.98 parts by weight of a 55 mm$^2$/s viscosity copolymer of a methylhydrogensiloxane and a dimethylsiloxane having both molecular terminals capped with trimethylsiloxy groups (content of silicon-bonded hydrogen was 0.48 wt. %, and the mole ratio of the silicon-bonded hydrogen to vinyl groups in the aforementioned copolymer of the dimethylsiloxane and the methylvinylsiloxane was 0.95), and 80 parts by weight of a 100 mm$^2$/s viscosity dimethylpolysiloxane having both molecular terminals capped with trimethylsiloxy groups. With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20), and 15 parts by weight of pure water. The emulsion was then further combined with an aqueous solution consisting of 7.03 parts by weight of ethanol and 0.63 parts by weight of phenoxyethanol of the following formula:

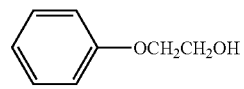

(a product of Yokkaichi Gosei Co., Ltd., type PHE-S; purity 92 to 94 wt. %), and 33.41 parts by weight of pure water. As a result, an aqueous emulsion of a silicone composition was prepared.

An aqueous emulsion of a platinum catalyst having a 0.3 μm average particle diameter was prepared by dispersing 1 part by weight of a mixed solution of 1,3-divinyltetramethyldisiloxane complexed with platinum, 1,3-divinyltetramethyldisiloxane, and isopropyl alcohol in an aqueous solution composed of 27 parts by weight of ion-exchange water and 0.3 parts by weight of the aforementioned polyoxyethylene sorbitan monolaurate.

After uniformly stirring the aforementioned aqueous emulsion of a platinum catalyst in an aqueous emulsion of the aforementioned silicone composition (with 5 ppm weight units of the metallic platinum per weight of the silicone composition), the mixture was allowed to sit for 1 day, and then an aqueous suspension of cross-linked silicone particles was prepared by cross-linking the silicone composition by a hydrosilylation reaction. Average diameter of the cross-linked silicone particles, average diameter of silicone oil drops in the emulsion, and emulsion stability are shown in Table 2.

Practical Example 6

A uniform mixture was prepared from 18.02 parts by weight of a 400 mm²/s viscosity copolymer of a dimethylsiloxane and a methylvinyl siloxane having both molecular terminals capped with dimethylvinylsiloxy groups (vinyl group content was 1.18 wt. %), 1.98 parts by weight of a 55 mm²/s viscosity copolymer of methylhydrogensiloxane and a dimethylsiloxane having both molecular terminals capped with trimethylsiloxy groups (content of silicon-bonded hydrogen was 0.48 wt. % and mole ratio of the silicon-bonded hydrogen to vinyl groups in the aforementioned copolymer of the dimethylsiloxane and the methylvinylsiloxane was 0.95), and 80 parts by weight of a 100 mm²/s viscosity dimethylpolysiloxane having both molecular terminals capped with trimethylsiloxy groups. With the use of a colloidal mill, the mixture was emulsified in an aqueous solution of 1 part by weight of a polyoxyethylene sorbitan monolaurate (the product of Kao Co., Ltd.; trademark REODOL SUPER-TW-L120; HLB=16.7; addition mole number of ethylene oxide 20) and 0.63 parts by weight of phenoxyethanol of the following formula:

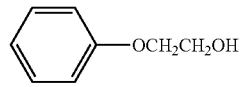

(a product of Yokkaichi Gosei Co., Ltd., type PHE-S; purity 92 to 94 wt. %), and 15 parts by weight of pure water. The emulsion was then further combined with an aqueous solution consisting of 7.03 parts by weight of ethanol, 0.63 parts by weight of the aforementioned phenoxyethanol, and 33.41 parts by weight of pure water. As a result, an aqueous emulsion of a silicone composition was prepared.

An aqueous emulsion of a platinum catalyst having a 0.3 µm average particle diameter was prepared by dispersing 1 part by weight of a solution of 1,3-divinyltetramethyldisiloxane complexed with platinum, 1,3-divinyltetramethyldisiloxane, and isopropyl alcohol in an aqueous solution composed of 27 parts by weight of ion-exchange water and 0.3 parts by weight of the aforementioned polyoxyethylene sorbitan monolaurate.

The aforementioned aqueous emulsion of a platinum catalyst was added to the aforementioned aqueous emulsion of the silicone composition (with 5 ppm by weight metallic platinum per weight of the silicone composition), the mixture was uniformly stirred, and then allowed to sit for 1 day. The silicone composition was cross-linked by a hydrosilylation reaction, and as a result, an aqueous emulsion of a silicone oil containing cross-linked silicone particles in silicone oil drops dispersed in water was obtained. Average diameter of the cross-linked silicone particles, average diameter of silicone oil drops in the emulsion, and emulsion stability are shown in Table 2.

TABLE 2

| Characteristics | Pr. Examples | |
|---|---|---|
| | Pr. Ex. 5 | Pr. Ex. 6 |
| Average dia. of silicone oil drops (µm) | 4.0 | 2.2 |
| Average dia. of cross-linked silicone particles (µm) | About 3 | About 1~2 |
| Emulsion stability: Water layer thickness (mm) | 3 | 2 |

Practical Example 7

A uniform mixture was prepared from 84.7 parts by weight of a dimethylpolysiloxane having both molecular terminals capped with dimethylhydroxysiloxy groups (number of repeating dimethylsiloxy units of about 11), 10.5 parts by weight of ethylene polysilicate, and 4.8 parts by weight of 3-glycidoxypropyltrimethoxysilane. With the use of a colloidal mill, the mixture was emulsified in an aqueous solution of 1.5 parts by weight of a polyoxyethylene sorbitan monolaurate (the product of Kao Co., Ltd.; trademark REODOL SUPER-TW-L120; HLB=16.7; addition mole number of ethylene oxide 20) and 28.5 parts by weight of pure water. The emulsion was then again diluted with 27 parts by weight of pure water, whereby an aqueous emulsion of a silicone composition was produced.

An aqueous emulsion of a tin-type catalyst with an average particle diameter of 1 µm was prepared by uniformly dispersing 1 part by weight of tin octylate in an aqueous solution prepared from 0.2 parts by weight of the aforementioned polyoxyethylene sorbitan monolaurate and 8.8 parts by weight of pure water. The aqueous emulsion of the tin-type catalyst was added to the aforementioned aqueous emulsion of the silicone composition. The mixture was uniformly stirred, and then allowed to sit for 1 day, whereby the silicone composition was cross-linked due to a de-alcoholation condensation reaction. As a result, an aqueous suspension of cross-linked silicone particles was obtained. Average diameter of the cross-linked silicone particles and suspension stability are shown in Table 3.

Comparative Example 6

An aqueous suspension of cross-linked silicone particles was prepared in the same manner as in Practical Example 7 with the exception that a polyoxyethylene sorbitan monostearate (the product of Kao Co., Ltd.; trademark REODOL SUPER-TW-S120; HLB=14.9; addition mole number of ethylene oxide 20) was used instead of the polyoxyethylene sorbitan monolaurate of Example 7. The average diameter of the cross-linked silicone particles and suspension stability are shown in Table 3.

TABLE 3

| Characteristics | Examples | |
|---|---|---|
| | Pr. Ex. 7 | Comp.. Ex. 6 |
| Average dia. of cross-linked silicone particles (µm) | 2.5 | 8.3 |
| Emulsion stability: Water layer thickness (mm) | 5 | 18 |

What is claimed is:

1. An aqueous emulsion of cross-linked silicone particles comprising (A) cross-linked silicone particles having an average diameter from 0.1 to 500 μm, (B) polyoxyethylene sorbitan monolaurate, (C) water, (E) oil, and (D), phenoxyethanol described by the general formula

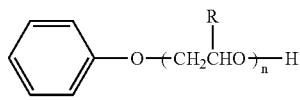

wherein R is selected from the group consisting of (i) a hydrogen atom and (ii) a methyl group and n is an integer from 1 to 10.

2. The emulsion of claim 1 comprising component (A) in drops of component (E) dispersed in water.

3. The aqueous emulsion of claim 1 having an addition mole number of ethylene oxide of component (B) of 10 to 25.

4. The aqueous emulsion of claim 1 having an addition mole number of ethylene oxide of component (B) of 18 to 22.

5. The aqueous emulsion of claim 1, where the HLB of component (B) is at least 10.

6. The aqueous emulsion of claim 1, where R is a hydrogen atom and n is 1.

7. The aqueous emulsion of claim 1, where the cross-linked silicone particles (A) have an average diameter of 0.1 to 50 μm.

8. The aqueous emulsion of claim 1, comprising 0.01 to 10 wt. % of component (B).

9. An aqueous suspension of cross-linked silicone particles comprising (A) cross-linked silicone particles having an average diameter of 0.1 to 500 μm, (B) polyoxyethylene sorbitan monolaurate, (C) water, and (D) phenoxyethanol described by the general formula

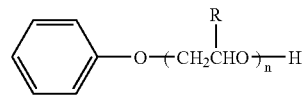

where R is selected from the group consisting of (i) a hydrogen atom and (ii) a methyl group and n is an integer from 1 to 10.

10. The aqueous suspension of claim 9, wherein component (A) comprises cross-linked silicone particles containing non-cross-linked silicone oil.

11. The aqueous suspension of claim 9, having an addition mole number of ethylene oxide of component (B) of 10 to 25.

12. The aqueous suspension of claim 9, having an addition mole number of ethylene oxide of component (B) of 18 to 22.

13. The aqueous suspension of claim 9, where component (B) has an HLB of at least 10.

14. The aqueous suspension of claim 9, where the cross-linked silicone particles (A) have an average diameter of 0.1 to 50 μm.

15. The aqueous suspension of claim 9, comprising 0.01 to 10 wt.% of component (B).

16. The aqueous suspension of claim 9, where R is hydrogen and n is 1.

* * * * *